May 26, 1970 W. S. CRONK ET AL 3,514,605
ELECTRO-CHEMICAL SYNERGISTIC CONTINUOUS INFRARED SOURCE
Filed July 17, 1967 4 Sheets-Sheet 1

INVENTORS
WILLIAM S. CRONK
IGNATIUS W. SEMMES
BY Harry A. Herbert Jr.
and
Arsen Tashjian
ATTORNEYS

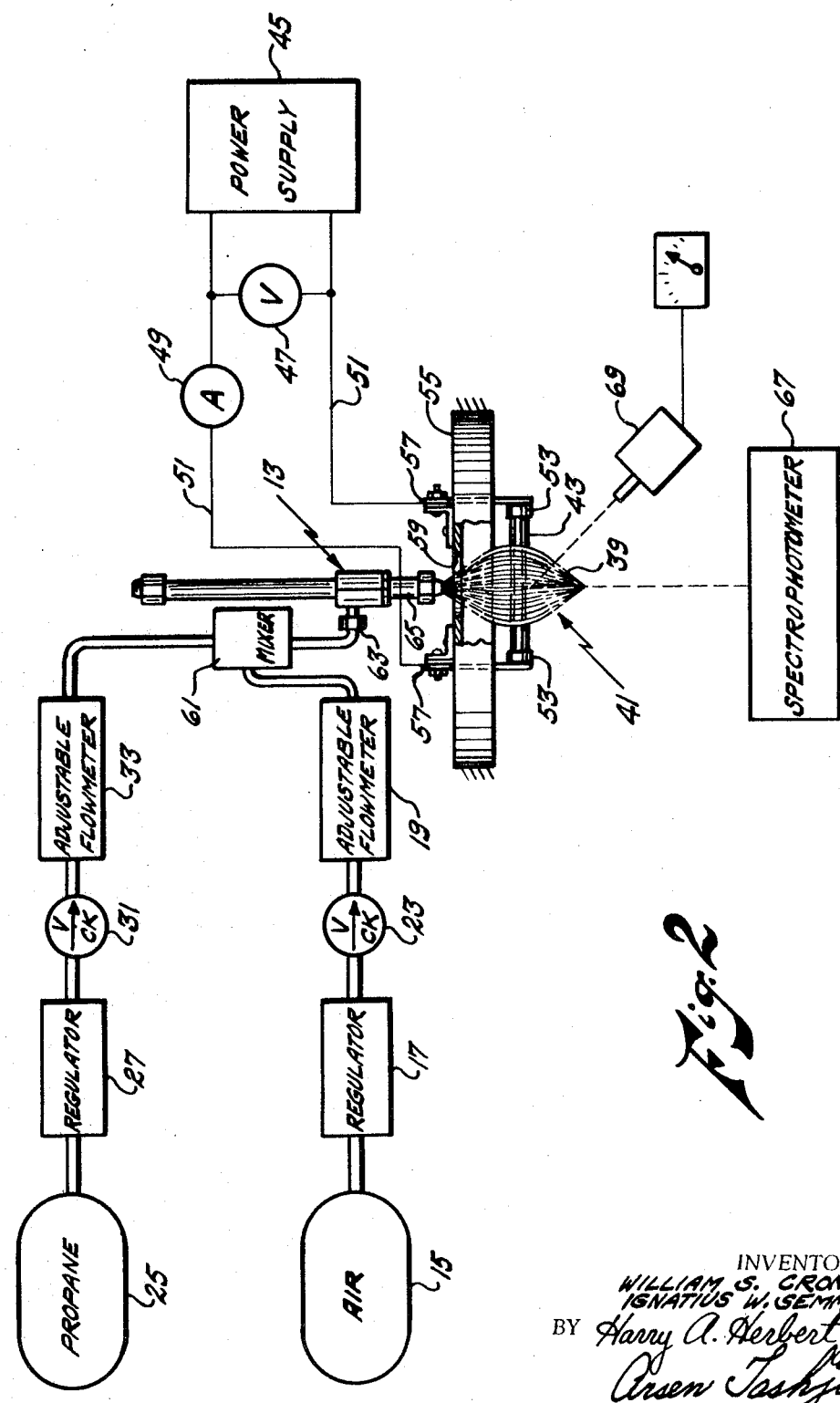

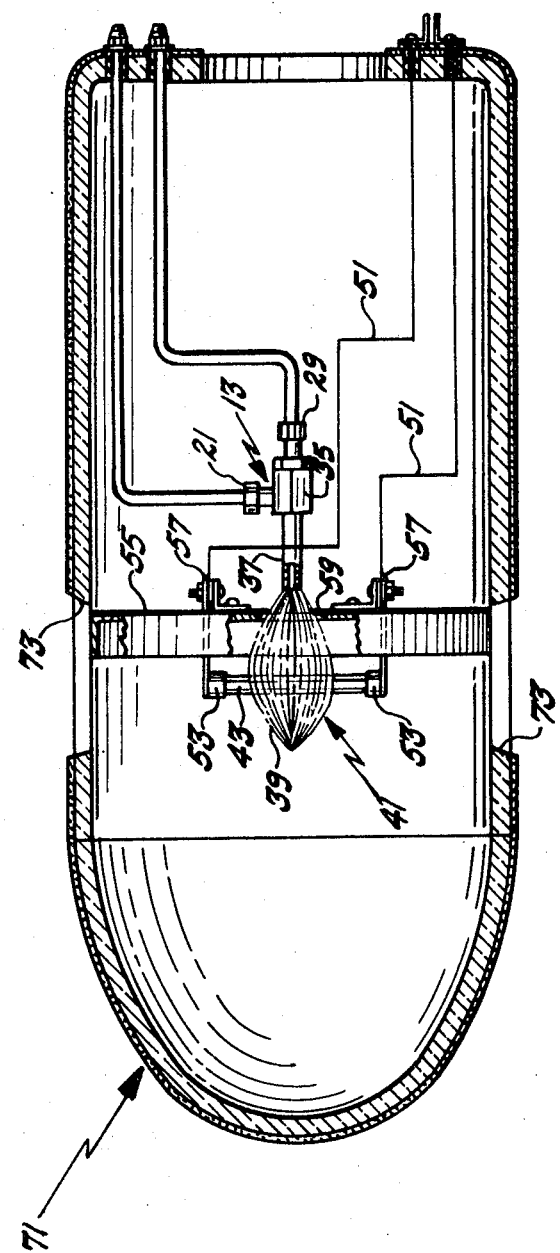

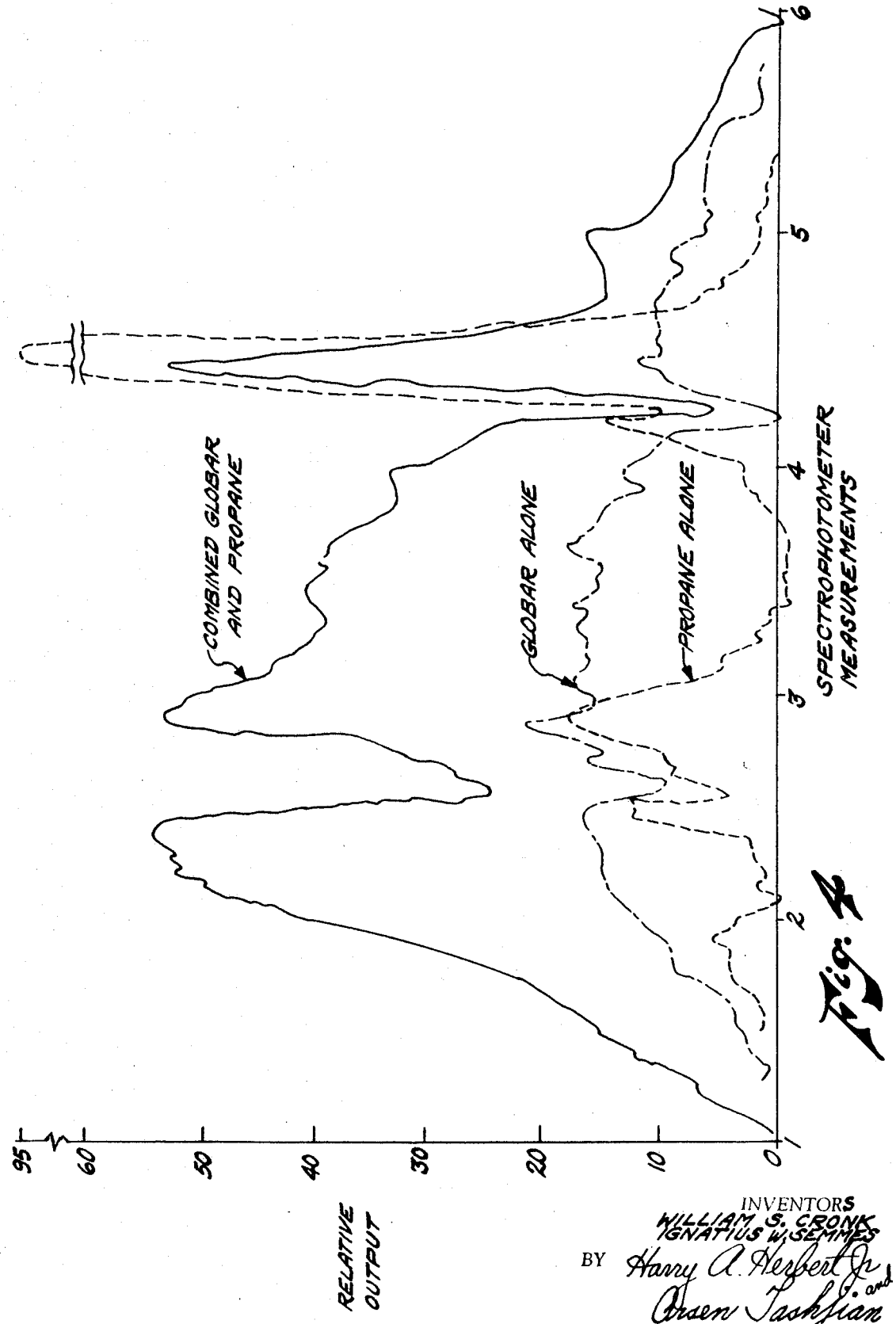

United States Patent Office 3,514,605
Patented May 26, 1970

3,514,605
ELECTRO-CHEMICAL SYNERGISTIC CONTINUOUS INFRARED SOURCE
William S. Cronk and Ignatius W. Semmes, Fort Walton Beach, Fla., assignors to the United States of America as represented by the Secretary of the Air Force
Filed July 17, 1967, Ser. No. 654,017
Int. Cl. H01j 35/00
U.S. Cl. 250—85      1 Claim

ABSTRACT OF THE DISCLOSURE

An electrical infrared element including a silicon carbide resistor is mounted for radiation in a cone reflector housing. The infrared element is combined with a propane-air flame which emanates from a modified vortex tube through an opening behind the element and is directed so as to envelope the active emission length of the element. The radiation source thus created by the cooperative action of the flame and element combination produces a total synergistic output approximately one and one-half times greater than the sum of the effect of the flame and the element taken independently.

---

This invention relates to a device for emitting radiant energy in the infrared spectrum and, more particularly, the invention is concerned with providing an infrared radiation source which combines an electrical element with a propane-air flame to produce a synergistic output which is greater than the sum of the output of each effect taken separately.

The tendency in recent times has been to supplement radar detection and guidance systems with ones which utilizes infrared radiation sensitive equipment. In the testing of infrared missile detection and tracking systems, it is necessary to provide a source of radiation in the infrared spectrum, particularly for the purpose of training personnel in the use of weapons and equipment having infrared sensitive homing mechanisms. In many applications, such as instrument calibration, missile tracking, infrared simulators, targets and the like, it is desirable to have an electromagnetic radiation source wherein the amount of energy emitted at any specified wavelength is accurately known. In airborne applications it is also desirable that the emitter be light weight and low in cost and emit strongly in certain preselected wavelengths.

The present invention provides apparatus which is useful as target sources for infrared guided missiles and as decoy countermeasure devices against such missiles. Also, the apparatus is useful as an infrared emitting device for testing and calibrating related instrumentation. A greater altitude capability is provided for airborne targets for heat-seeking missiles falling within the range of a wider variety of missiles. When the invention is used in simulated enemy aircraft, the infrared source herein disclosed allows continuous radiation so that pilots can lock-on and the missile will track until the target is reached and destroyed. Previously known pyrotechnic devices used as infrared sources usually burn out before the missile reaches the target, thus, preventing successful completion of the training mission.

Accordingly, it is an object of the invention to provide a source of constant infrared radiation utilizing a synergistic combination of a propane-air flame sheath over an electrical infrared element.

Another object of the invention is to provide a source of infrared energy which is relatively independent of altitude conditions allowing utilization as an aircraft tow target infrared source.

Still another object of the invention is to provide an infrared energy source having the required combination of high output and controllable selective emission.

A further object of the invention is to provide a radiation emission system for a tow target operating in the infrared range wherein the system is clean and smokeless with no large ionized plume being exhibited.

A still further object of the invention is to provide an infrared radiation source produced by a combined globar and propane-air flame wherein the hot carbon dioxide in the propane causes a distinct emission which is controllable in output by direct control of the propane flow.

Another still further object of the invention is to provide a continuous infrared source having a synergistic output which occurs because of the interchange of calories between the globar and the propane-air flame which contribute to each other's thermal efficiency producing a combined effect greater than the sum of both effects taken separately.

These and other objects, features, and advantages will become more apparent after considering the following detailed description taken in connection with the illustrative embodiment in the accompanying drawings, wherein:

FIG. 2 is a block diagram of another embodiment of the invention using a different modified vortex tube as the source for providing a flame sheath over the electrical infrared element;

FIG. 3 is a view of a typical application of an infrared radiation source according to the invention being utilized as an airborne tow target for testing infrared sensing equipment; and FIG. 4 is a graphical indication of the synergistic effect of combining the electrical infrared source with the propane-air flame.

Figure 1:
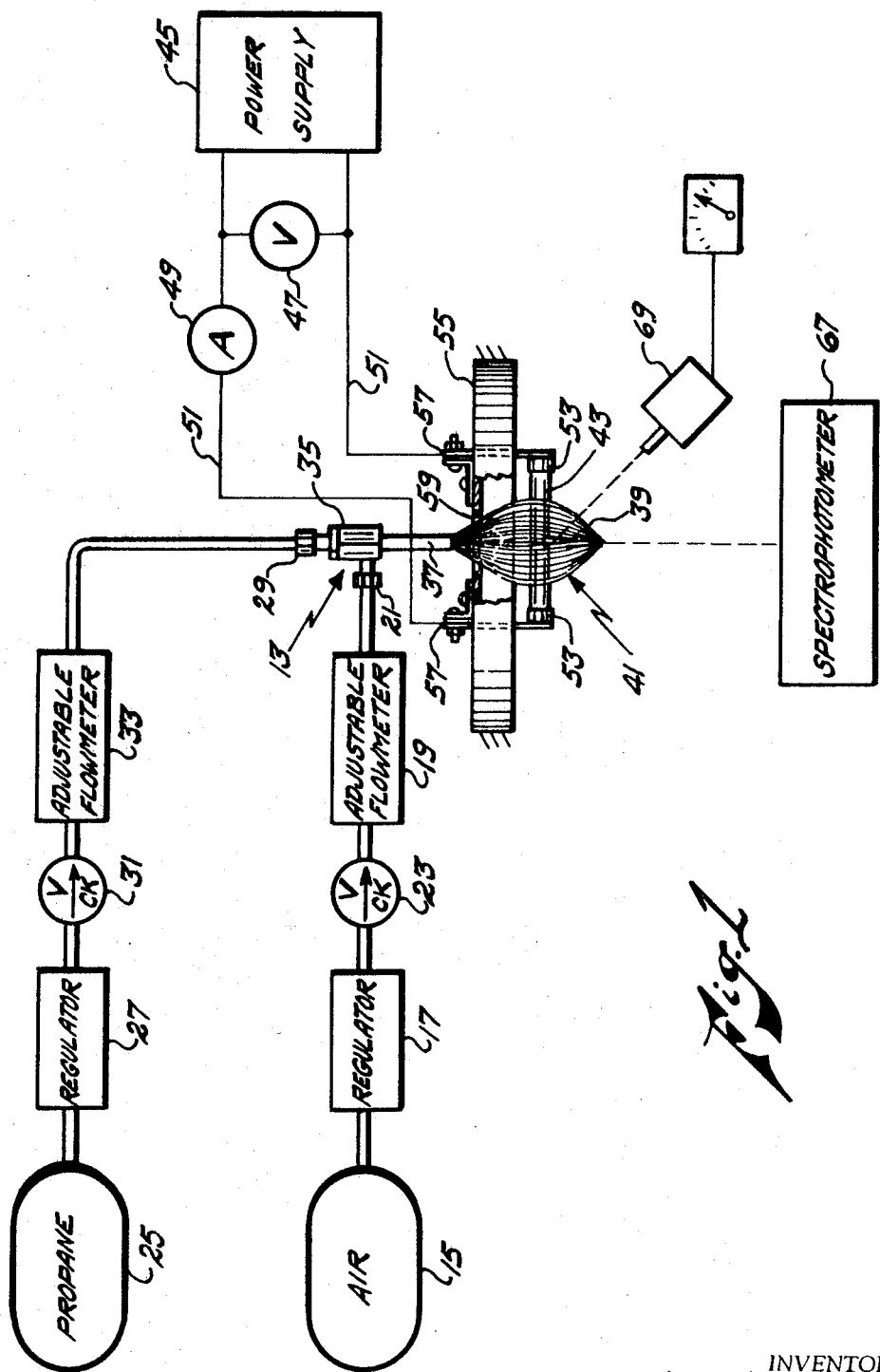
FIG. 1 is a block diagram of an infrared radiation source according to the invention showing a propane-air flame from a modified vortex tube enveloping an electrical infrared element.

Referring now to the drawings wherein like reference characters refer to like structural elements in the several views, the infrared source according to this invention shown in FIG. 1 includes a modified vortex tube 13 as the outlet for the flame source. A complete description of the essential elements of the vortex tube 13 including the theory and development thereof is outlined in U.S. Pat. No. 3,208,229. In the present invention a compressed air tank 15 controlled by a regulator 17, delivers air through the flowmeter 19 to one of the inlets 21 of the modified vortex tube 13. A check valve 23 is provided for operation when it is desired to close off the air supply completely.

A tank of propane gas 25 which is controlled by the regulator 27 is also operatively connected to the vortex tube 13 through the inlet port 29. A check valve 31 operates as an on-off means for controlling the supply of propane to the vortex tube 13 while the flowmeter 33 maintains the flow at the desired level. The propane gas and air from their respective tanks meet and mix in the body section 35 of the vortex tube 13 and then pass through the outlet 37 to the tip thereof which operates as a nozzle to support the flame 39.

In conjunction with the vortex tube 13, there is included an electrical infrared source 41 having a silicon carbide element 43 such as a globar as the primary radiating means. Under typical operating conditions, the power supply 45 delivers 48.5 volts as measured by voltmeter 47 and 30 amperes as measured by the ammeter 49 raising the surface temperature in the active section of the element to 1400° centigrade. The power passes through the lines 51 to the contacts 53 which are tensed by spring metal and are machined to provide uniform contact interface between the metal contacts 53 and the ends of the silicon carbide element 43.

For the purposes of testing the operation of the infrared source, a backplate 55 is positioned behind the element 43 and provides a mounting means to which the electrical connections 57 and physical mountings for the element 43 are fitted. On the center line directly behind the element 43, an aperture 59 is disposed in the backplate 55 through which the flame 39 passes. The diameter of the aperture 59 will vary with the size of the flame sheath which is determined by the dimensions of the vortex tube flame source. In the embodiment shown in FIG. 1, certain operating elements have been omitted so that the testing procedure can be effectively completed. These operating elements may be combined with the infrared source as part of an airborne tow target for use in testing infrared sensing equipment.

In FIGURE 2 there is show an alternative embodiment of the vortex tube propane-air flame source. In this burner, a mixer 61 receives both the propane and air which is then fed into the modified inlet 63. The outlet 65 of the flame source 13 directs the flame 39 toward the electrical source 41 and envelops it in a sheath of flame. A spectrophotometer 67 is positioned in alignment with the infrared source for the purpose of measuring the total infrared output of the source. The measurement indicates that the output of the hereinbefore described infrared sources is synergistic, that is, the combined total output of the source is considerably more than the sum of the output of the electrical element and the flame taken separately. Optical pyrometer means 69 is provided to measure the linear temperature distribution of the silicon carbide element 43 of the infrared source.

In FIG. 3 there is shown an airborne tow target 71 which utilizes an infrared source according to the invention. The vortex tube flame source 13 is similar to that shown in FIG. 1 where the air and propane enter the inlets 21 and 29, respectively, and are then mixed in the body section 35 and the mixture exits through the outlet 37. The openings 73 are provided in the target 71 so that any associated sensing apparatus can be affected by the radiation from the infrared source.

In operation, an electrical infrared radiation source when utilized as at tow target is adversely effected by low ambient temperatures which occur at higher altitudes. For instance, at an altitude of 40,000 feet, the mean static temperature is approximately 69.7 degrees F. below zero. As the temperature lowers, the resistivity of the electrical infrared source 41 increases rapidly because of the negative coefficient of resistance of the silicon carbide element 43 affecting the current flow so that little or no current is drawn and therefore no temperature rise with resulting infrared output will occur. When the propane-air flame source 13 is used in combination with the electrical source 41 in the manner hereinbefore described, the effective ambient temperature is raised allowing the element 43 to operate in an unusually efficient manner and produce an infrared source which is particularly effective especially for testing heat sensing equipment.

In FIG. 4 there is graphically shown an indication of the phenomenon which occurs when the propane-air flame is combined with the electrical source. The interchange of calories between the two heat sources contributes to the thermal efficiency of both sources so that their combination becomes more efficient than the addition of the separate efficiencies. Referring to FIG. 4, the actual areas of each curve were measured in the significant infrared range to determine the relative total power outputs of both infrared rtdiation sources. In a typical experimental result such as shown in FIG. 4, the area of the flame output curve plus the area of the powered output curve alone was found to be equal to 1311 whereas the area of the combination flame and element output curve is equal to 1913. Thus, the flame-element combination is 1.46 times the algebraic sum of the flame output alone plus the element output alone producing the unusual and desirable synergistic effect. The characteristic spike effect shown in the graph is caused by hot molecules of carbon dioxide from the propane-air flame emitting selective radiation. This characteristic is useful for signature discrimination requirements and can be varied by adjusting flow rates of propane and air.

Although the invention has been illustrated in the accompanying drawings and described in the foregoing specification in terms of preferred embodiments thereof, it should be understood that the invention is not limited to these embodiments or to the particular uses mentioned. It will be apparent to those skilled in the art that the invention may be practiced by utilizing other electrical element materials in various configurations and with other fuels and oxidizers besides the propane-air flame source described herein.

Also, it should be understood that various changes, alterations, modifications, and substitutions particularly with respect to the construction details can be made in the arrangement of the several elements without departing from the true spirit and scope of the appended claims.

Having thus described our invention, what we claim and desire to secure by Letters Patent of the United States is:

1. A source of continuous infrared radiation for use in an airborne tow target comprising, in combination, a bonded silicon carbide electrical resistance element of elongated configuration, a backplate having a central aperture therein, said electrical element being mounted on the front of said backplate across said aperture, power supply means for providing a voltage of 48.5 and a current flow of 30 amperes through said electrical element producing radiation in the infrared range, and a vortex tube mounted behind said backplate and in axial alignment with the aperture therein for passing a flame therethrough, said vortex tube having a first intake for receiving propane gas, and a second intake for receiving oxygen, the oxygen and propane being mixed in said vortex tube in such proportion that the flame produced from the mixture includes hot molecules of carbon dioxide having distinct and controllable infrared emission characteristics, the flame from said vortex tube enveloping substantially all of the active emission length of said electrical element, the combined flame and electrical sources producing a total infrared radiation output substantially greater than the sum of the outputs of the element and the flame operating independently.

References Cited

UNITED STATES PATENTS 2,328,506  8/1943  Snelling _____ 219—200
3,100,828  8/1963  Jacobs et al. _____ 250—85 X WILLIAM F. LINDQUIST, Primary Examiner U.S. Cl. X.R.

219—279